(12) United States Patent
Elazar-Mittelman et al.

(10) Patent No.: US 7,739,832 B2
(45) Date of Patent: Jun. 22, 2010

(54) METHOD AND APPARATUS FOR DISPLAYING AND TRANSPORTING FLORAL ARRANGEMENTS

(76) Inventors: Irit Elazar-Mittelman, 304 Chartwell Dr., Silver Spring, MD (US) 20904; Shai Mittelman, 304 Chartwell Dr., Silver Spring, MD (US) 20904

( * ) Notice: Subject to any disclaimer, the term of this patent is extended or adjusted under 35 U.S.C. 154(b) by 423 days.

(21) Appl. No.: 11/727,143

(22) Filed: Mar. 23, 2007

(65) Prior Publication Data

US 2008/0230419 A1   Sep. 25, 2008

(51) Int. Cl.
   *A47G 7/02*   (2006.01)
(52) U.S. Cl. ............... 47/41.12; 47/65; 47/84; 206/423
(58) Field of Classification Search ........... 47/41.12, 47/41.01, 41.11, 41.13, 41.15, 65, 84, 74, 47/72; 206/423; 428/23
   See application file for complete search history.

(56) References Cited

U.S. PATENT DOCUMENTS

| | | | |
|---|---|---|---|
| 2,578,271 A | | 12/1951 | Teufel |
| 2,639,552 A | * | 5/1953 | Tredup ................ 47/41.13 |
| 2,721,022 A | * | 10/1955 | Billerbeck ........... 229/117.15 |
| 2,767,831 A | * | 10/1956 | Brecht ................. 206/423 |
| 2,774,187 A | | 12/1956 | Smithers |
| 2,889,920 A | | 6/1959 | Andress |
| 2,934,204 A | * | 4/1960 | Pardee ................. 206/423 |
| 3,368,303 A | * | 2/1968 | Tong .................. 47/41.12 |
| 3,651,601 A | | 3/1972 | La Montague |
| 3,657,840 A | | 4/1972 | Benoist |
| 3,869,828 A | | 3/1975 | Matsumoto |
| 3,883,990 A | | 5/1975 | Stidolph |
| 3,962,503 A | * | 6/1976 | Crawford .............. 428/40.1 |
| 4,118,890 A | * | 10/1978 | Shore ................. 47/29.3 |
| 4,248,347 A | | 2/1981 | Trimbee |
| 4,282,683 A | * | 8/1981 | Frankel ............... 47/41.01 |
| 4,292,760 A | | 10/1981 | Krave |
| D279,280 S | | 6/1985 | Resnick |
| 4,936,046 A | * | 6/1990 | Miller ................ 47/41.01 |
| 5,092,465 A | | 3/1992 | Weder |

(Continued)

FOREIGN PATENT DOCUMENTS

FR   2 597 320   10/1987

(Continued)

*Primary Examiner*—T. Nguyen
(74) *Attorney, Agent, or Firm*—Edell, Shapiro & Finnan, LLC

(57) ABSTRACT

A floral arrangement assembly according to the present invention embodiments provides protection and maintenance of a floral arrangement during display, transport and/or shipping. The floral arrangement assembly includes a floral retaining structure, a base to secure the floral retaining structure and a cover. The floral retaining structure includes a floral holding material secured to a platform via a suitable adhesive. A plurality of prongs may further be secured to the platform and utilized to engage the floral holding material. The floral retaining structure may further include a plate secured to the assembly base with the platform secured to the plate via a plurality of ties. Alternatively, the floral retaining structure may be secured directly to the assembly base via the plurality of ties. The floral arrangement assembly may be placed within a water proof bag or other containers, where optional cooling and absorption materials may be placed underneath the assembly.

20 Claims, 14 Drawing Sheets

U.S. PATENT DOCUMENTS

| | | |
|---|---|---|
| 5,115,915 A * | 5/1992 | Harris ........................ 206/524 |
| 5,235,780 A | 8/1993 | Colbert |
| 5,240,109 A | 8/1993 | Weder |
| 5,407,072 A | 4/1995 | Weder |
| 5,454,189 A | 10/1995 | Graham et al. |
| 5,657,868 A * | 8/1997 | Taylor ........................ 206/423 |
| 5,710,641 A * | 1/1998 | Lowry et al. ................ 358/462 |
| 6,167,653 B1 * | 1/2001 | Van den Kieboom .......... 47/84 |
| 6,604,632 B2 | 8/2003 | Weder |
| 2005/0011116 A1 | 1/2005 | Miller et al. |

FOREIGN PATENT DOCUMENTS

| | | |
|---|---|---|
| JP | 6-197831 A | 7/1994 |
| JP | 10276895 | 10/1998 |
| WO | WO 03/008305 A1 | 1/2003 |

* cited by examiner

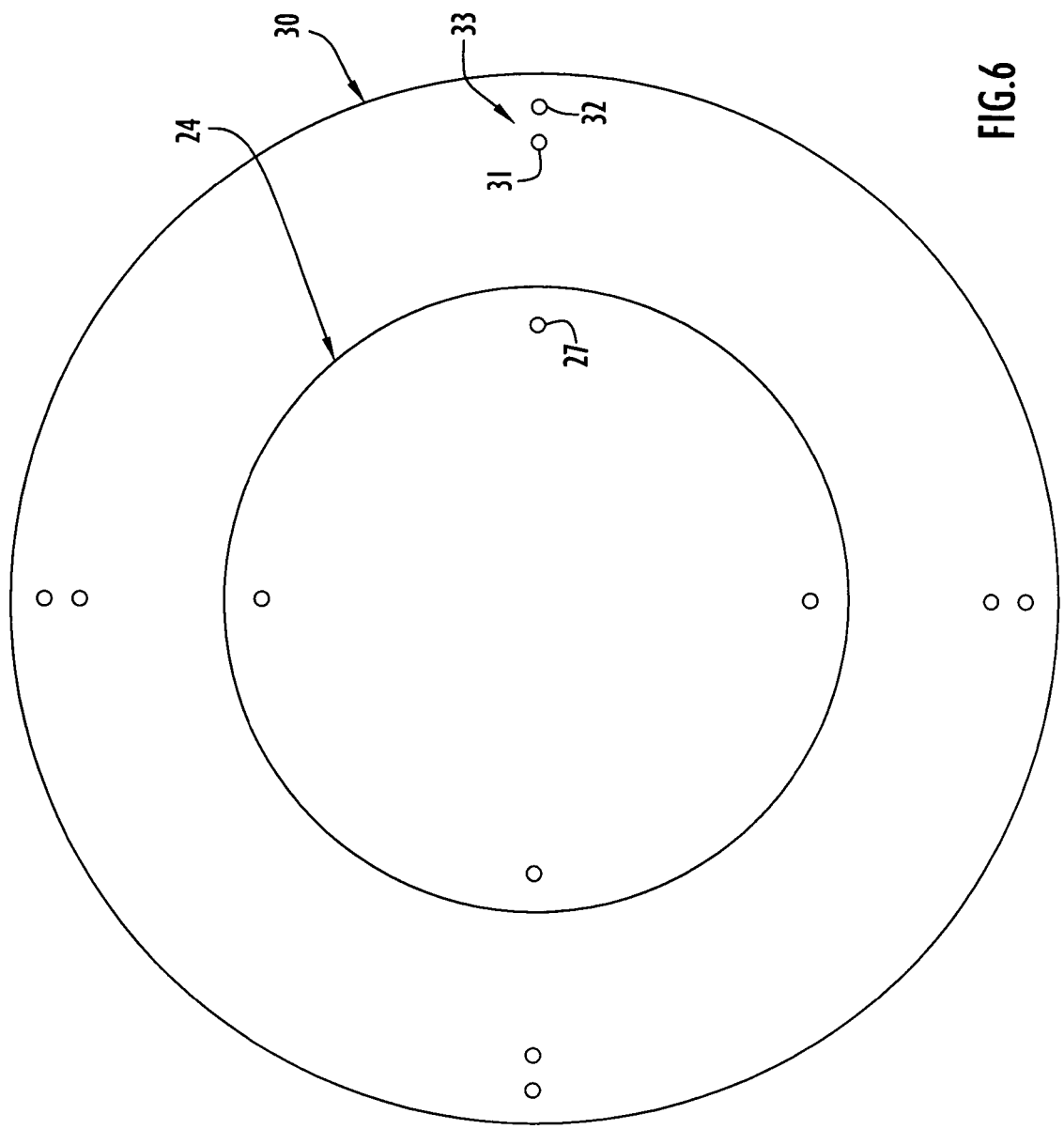

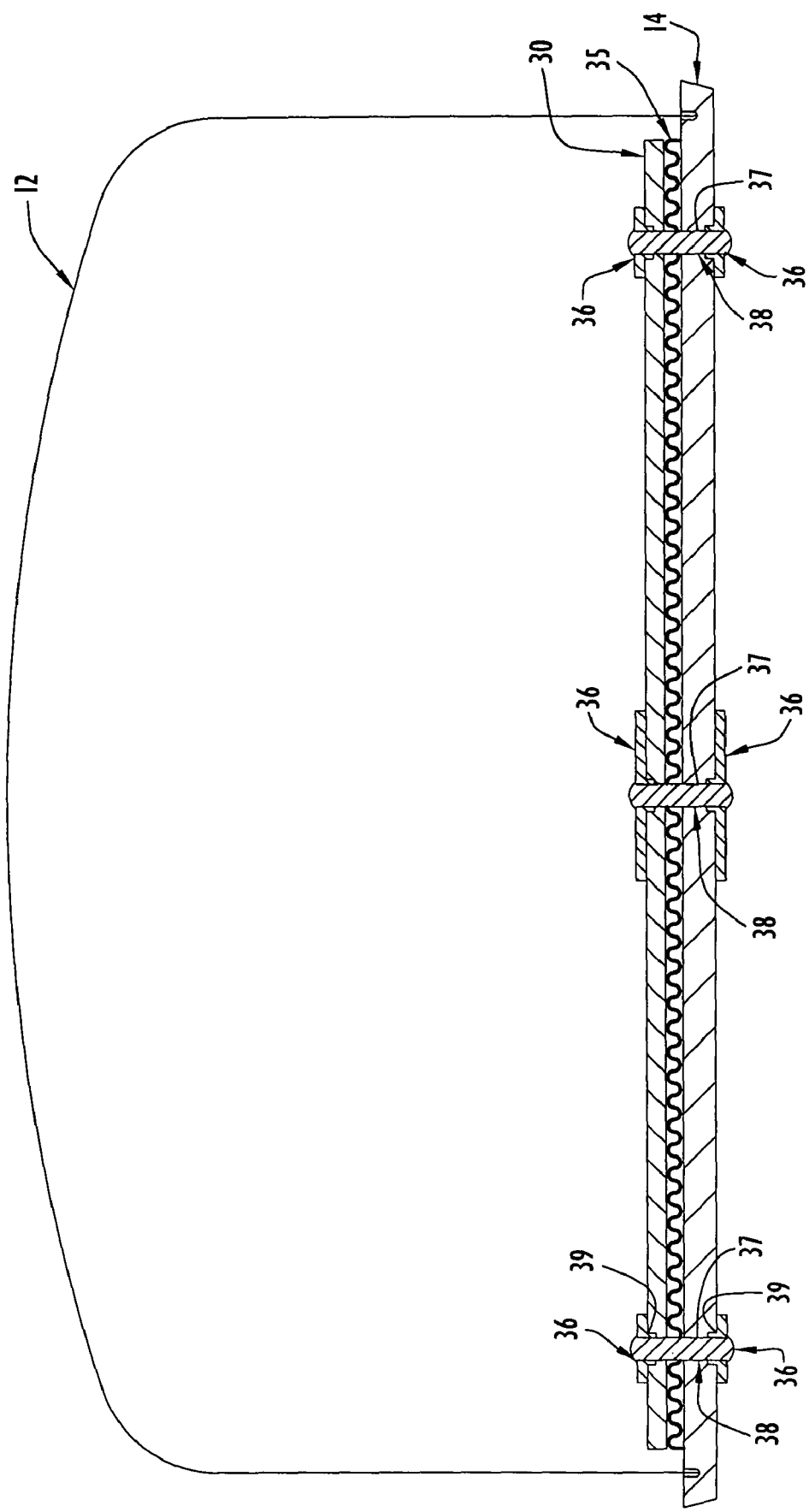

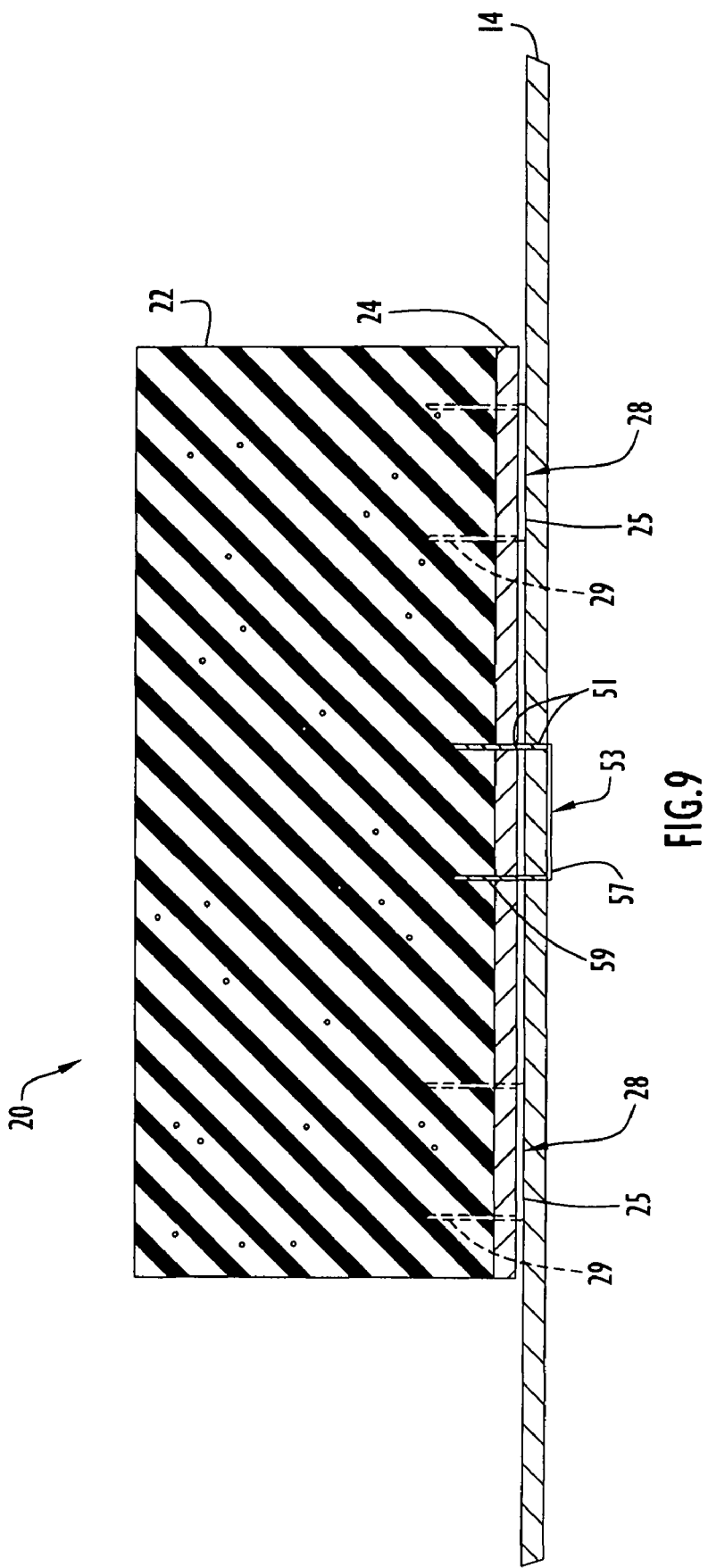

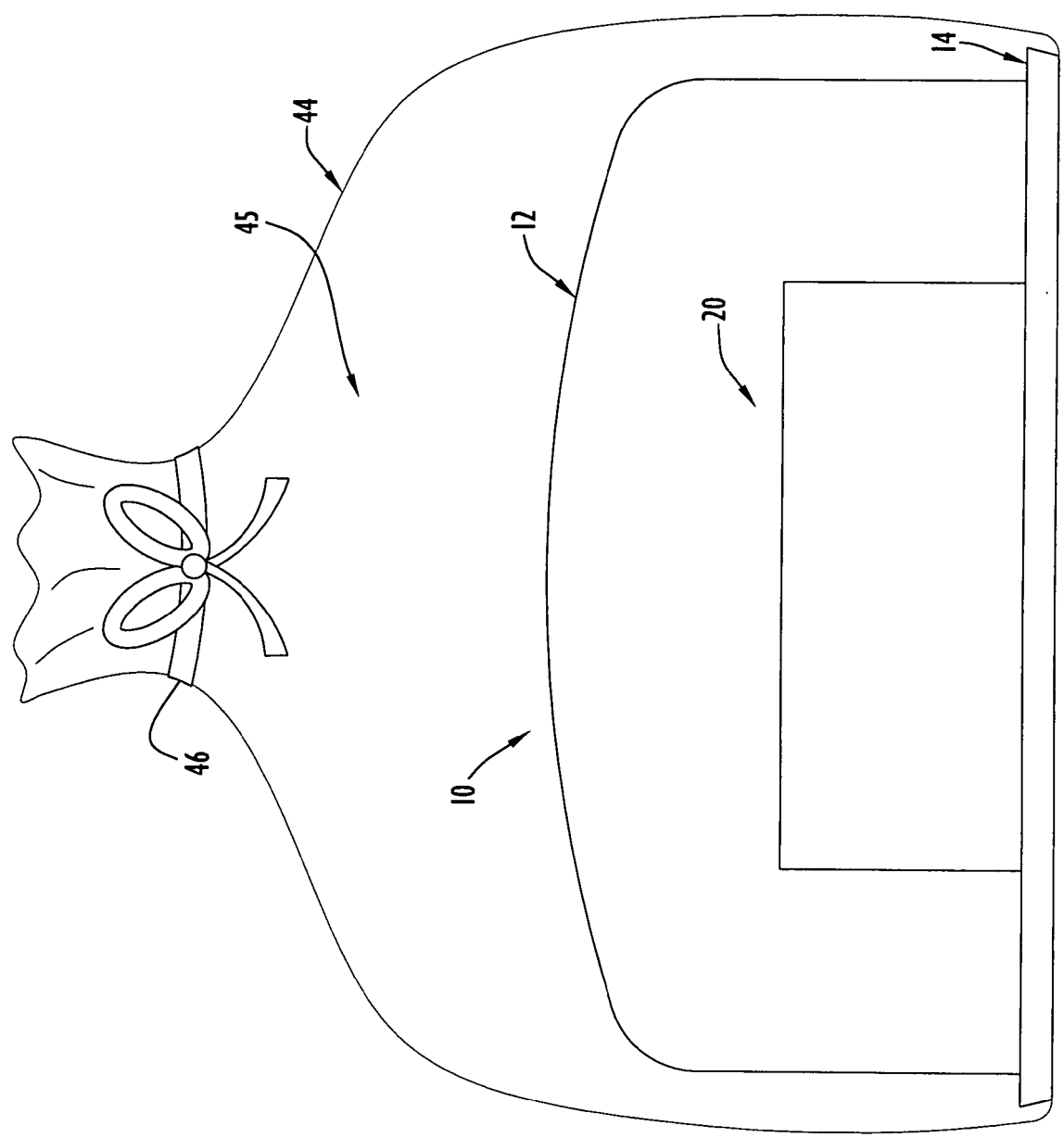

METHOD AND APPARATUS FOR DISPLAYING AND TRANSPORTING FLORAL ARRANGEMENTS

BACKGROUND OF THE INVENTION

1. Technical Field

The present invention pertains to display and transport of floral arrangements. In particular, the present invention pertains to a floral retaining structure for display of a floral arrangement and a transport container employing the floral retaining structure to maintain the floral arrangement intact during transport and/or shipping.

2. Discussion of Related Art

Generally, flowers may be arranged in various fashions for an aesthetically pleasing appearance (e.g., bouquets, etc.). However, these floral arrangements tend to be delicate and may easily become disarrayed during handling. This problem is exacerbated with respect to shipping the floral arrangement by a common carrier (e.g., shipping services company, governmental postal system, etc.). For example, shipping a floral arrangement via the common carrier typically requires the floral arrangement (and the container including the floral arrangement) to withstand vibration, impact and various orientations (e.g., sideways, upside down, etc.) during shipping. Since conventional packaging solutions for floral arrangements do not provide an adequate solution that is practical for shipping, florists or other floral professionals are limited to hand deliver the floral arrangements, thereby limiting their market reach to the delivery area around them. Even with employing the hand carry delivery approach, the floral arrangements are still delicate and special care is preferably employed to maintain the arrangements intact.

Moreover, some floral arrangement structures employ holding materials to secure flowers thereto. However, these types of floral arrangement structures tend to place the material into a container that may significantly limit the useable surface area of the material, thereby restricting the design and quantity of flowers that may be secured. Floral arrangements that do not employ a container for the holding material may create problems during shipping since there is generally no manner to attach or fasten the material to the packaging or shipping container, thereby enabling the floral arrangements to become disarrayed during shipping and handling. Thus, the conventional display and shipping configurations described above are inadequate to maintain the floral arrangements intact under the conditions accompanying handling of the configurations, especially for floral arrangements that utilize substantially the entire floral holding material and need to be presented on a flat surface, such as a plate.

SUMMARY OF THE INVENTION

Accordingly, the present invention embodiments pertain to a floral arrangement assembly or packaging for protection and maintenance of a floral arrangement during display, transport and/or shipping. The present invention embodiments provide a stabilized and secure manner to display, ship and/or transport the floral arrangement using the same packaging, while enabling easy removal of the floral arrangement from the packaging by the customer. In particular, the floral arrangement assembly includes a floral retaining structure, a base to secure the floral retaining structure and a cover. The floral retaining structure includes a floral holding material (e.g., foam, etc.) secured to a platform via a suitable adhesive (e.g., tape, glue, etc.). A plurality of prongs may further be secured to the platform and utilized to engage or penetrate the floral holding material to enhance the attachment of the floral holding material to the platform. The floral retaining structure may further include a plate with the platform secured thereto via a plurality of ties, where the plate is further secured to the assembly base using suitable techniques (e.g., adhesives, glue, pins, etc.). Alternatively, the floral retaining structure may be secured directly to the assembly base (e.g., without the plate) via the plurality of ties. The floral arrangement assembly may be placed within a water proof bag (e.g., transparent, etc.) including optional cooling (e.g., frozen gel, etc.) and absorption materials placed underneath the assembly to assist in maintaining an appropriate temperature for the floral arrangement and to absorb condensation within the bag during shipping.

The present invention embodiments provide several advantages. For example, the present invention embodiments provide a secure packaging for floral arrangements intended for use with or without placement in a container. These types of arrangements may be set on the plate for display without any additional container to hold the floral holding material. Further, the present invention packaging secures the floral arrangement to the packaging base, thereby preventing adverse movement of the floral arrangement (e.g., sideways, upside down, sway from the base of the package, etc.) that enables the arrangement to become disarrayed during transport, shipping and/or handling.

The above and still further features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIG. 6 is a top view in plan of the platform and plate of FIG. 5.

FIG. 7 is a view in elevation and partial section of the plate of the floral retaining structure of FIG. 4 secured to the assembly base according to an embodiment of the present invention.

FIG. 9 is a view in elevation and partial section of the platform of the floral retaining structure of FIG. 2 secured directly to the assembly base via a fastening device according to an embodiment of the present invention FIG. 10 is a view in elevation of the floral arrangement assembly of FIG. 1 placed within a waterproof bag according to an embodiment of the present invention.

DETAILED DESCRIPTION OF THE PREFERRED EMBODIMENTS

Figure 1:
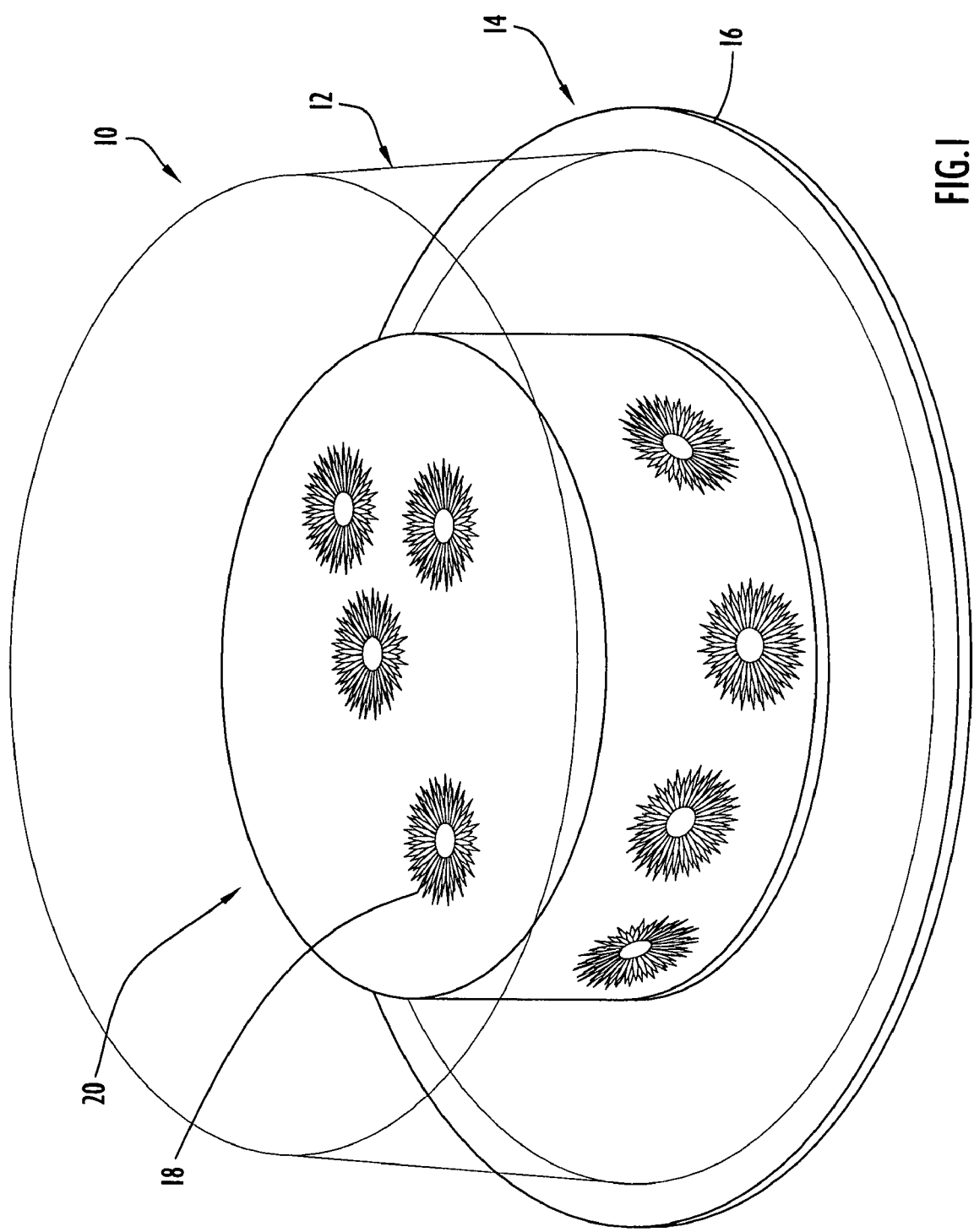
FIG. 1 is a view in perspective of a floral arrangement assembly according to an embodiment of the present invention.

The present invention embodiments pertain to a floral arrangement assembly or packaging for protection and maintenance of a floral arrangement during display, transport and/or shipping. The present invention embodiments provide a stabilized and secure manner to display, ship and/or transport the floral arrangement without the arrangement becoming disarrayed. A floral arrangement assembly or packaging according to an embodiment of the present invention is illustrated in FIG. 1. Specifically, a floral arrangement assembly 10 includes a cover 12, a base 14 and a floral retaining structure 20. The floral retaining structure receives and maintains flowers 18 in a desired arrangement and is secured to the top surface of base 14 as described below. Flowers 18 may be fresh cut and/or dried flowers depending upon the particular floral arrangement. The floral arrangement assembly may serve as a display case and/or shipping container to maintain the floral arrangement intact.

Base 14 is substantially circular and includes an upwardly extending peripheral wall or lip 16. Base 14 includes dimensions greater than those of floral retaining structure 20 to enable that structure to be disposed on the base. Cover 12 is substantially cylindrical and includes an open bottom portion and a closed top portion. The dimensions of cover 12 are slightly less than those of base 14 to enable the cover to be received on the base with the cover bottom peripheral edges disposed interior of and proximate lip 16. The height of cover 12 is greater than corresponding dimensions of floral retaining structure 20 to enable the cover to receive the floral arrangement through the open bottom portion and encompass the floral arrangement. The cover may be constructed of any suitable materials (e.g., plastics, etc.) and is preferably transparent to enable viewing of the floral arrangement therethrough. By way of example only, the combination of cover 12 and base 14 provide a container generally in the form of a dome as described above. However, the present invention embodiments are not limited to this type of container and may be utilized with or include various forms of containers of any shapes or sizes. For example, the base and cover may correspond to a box (e.g., preferably transparent) and lid combination, where floral retaining structure 20 may be secured to the bottom of the box in substantially the same manner described below.

Figure 2:
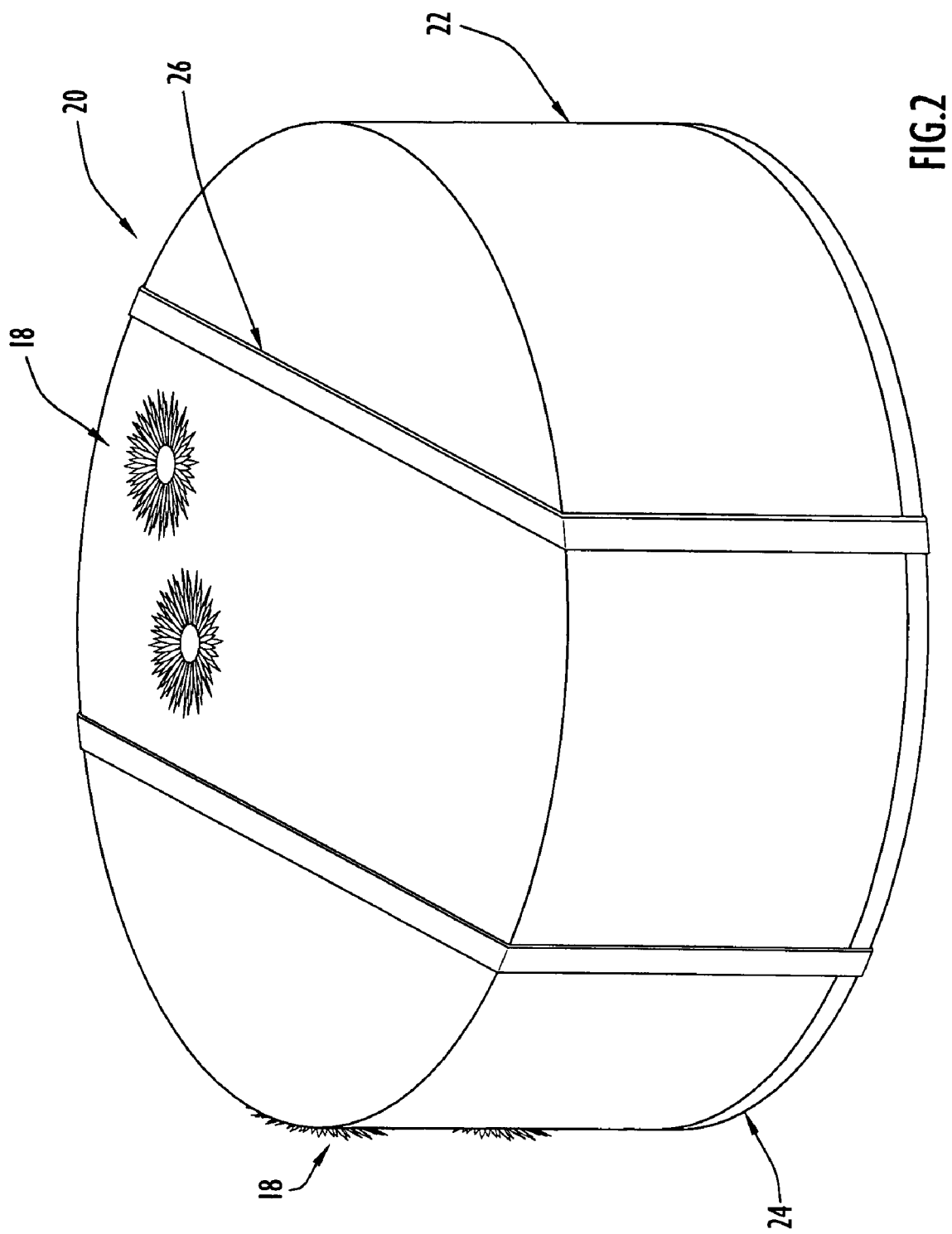
FIG. 2 is a view in perspective of the floral retaining structure of the assembly of FIG. 1 according to an embodiment of the present invention.
Figure 3:
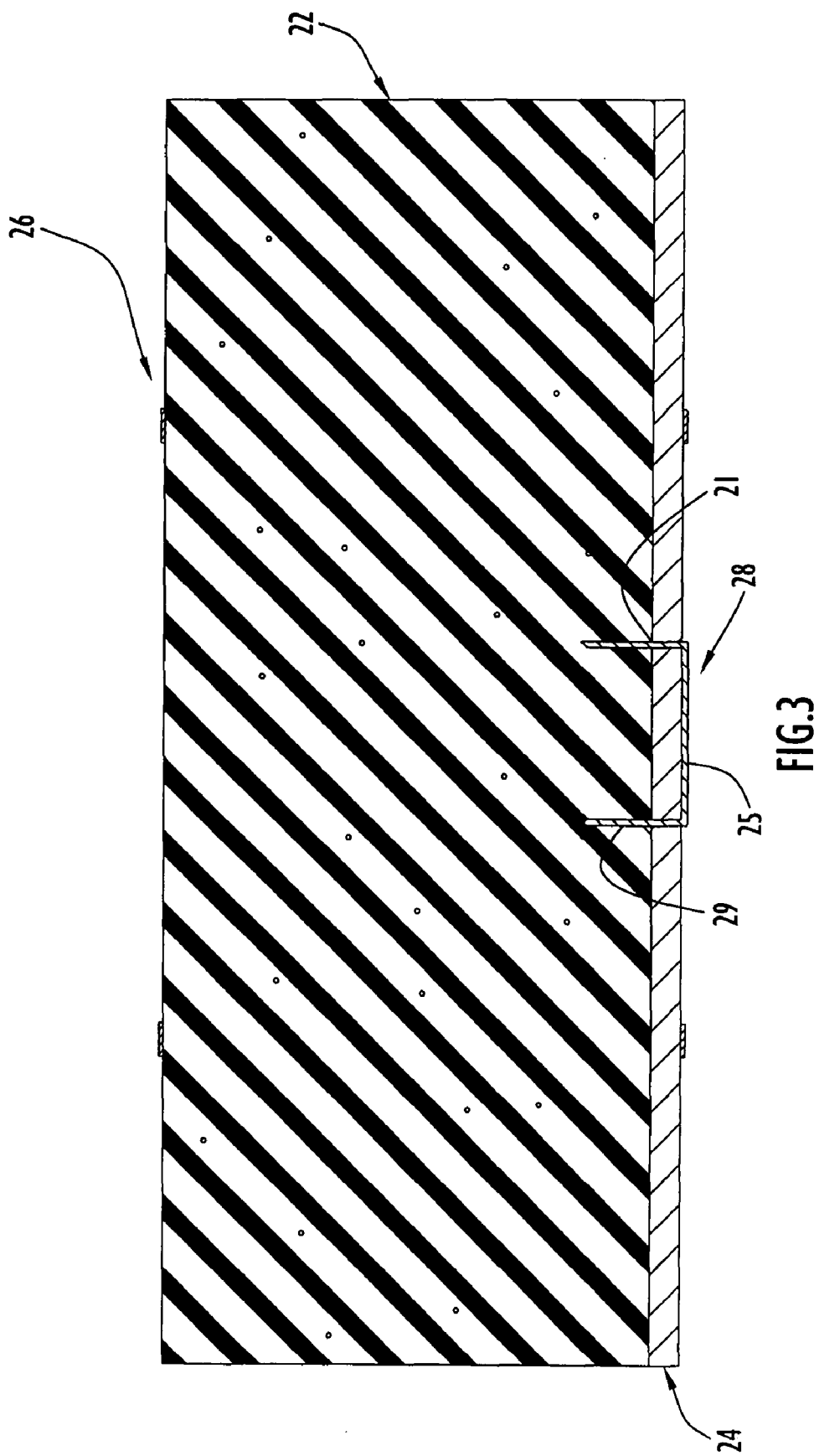
FIG. 3 is a view in elevation and section of the floral retaining structure of FIG. 2.

Floral retaining structure 20 according to an embodiment of the present invention is illustrated in FIGS. 2-3. Specifically, floral retaining structure 20 includes a floral holding material (e.g., foam, etc.) 22, a platform 24 and a plurality of straps 26. Platform 24 is substantially cylindrical in the form of a generally flat plate or disk and may be constructed of any suitable materials (e.g., plastics, etc.). Floral holding material 22 is in the form of a generally cylindrical block with cross-sectional dimensions similar to those of platform 24. In other words, the platform includes dimensions tailored to the dimensions and shape of the floral holding material. The floral holding material may be implemented by any suitable materials (e.g., foam, sponge, etc.) to receive and secure flowers or other items within a floral arrangement. Platform 24 basically reinforces floral holding material 22 to provide enhanced support for insertion or reception of flowers 18.

Floral holding material 22 is secured to platform 24 via a fastening device or anchor 28. The fastening device is utilized to engage floral holding material 22 and attach the floral holding material to the platform. Fastening device 28 includes a substantially circular disk member 25 with a plurality of prongs 29 disposed toward the disk member peripheral edge and extending upwardly therefrom. Prongs 29 penetrate and engage floral holding material 22 to further secure the floral holding material to platform 24. Disk member 25 is typically secured to the platform bottom surface, preferably at a substantially central location thereon. Platform 24 includes openings 21 each including dimensions slightly greater than those of prongs 29 and defined in the platform substantially coincident the prongs to receive the prongs therethrough. Prongs 29 extend through platform 24 (e.g., via openings 21) and into floral holding material 22 to penetrate and engage that material, thereby securing the floral holding material to the platform. Alternatively, disk member 25 may be secured to the top surface of platform 24, preferably at a substantially central location thereon, via any suitable adhesives (e.g., tape, glue, etc.), where prongs 29 directly penetrate and engage the floral holding material. By way of example only, fastening device 28 includes three prongs angularly displaced from each other by approximately 120°. However, the floral retaining structure may employ any quantity of fastening devices with any quantity of prongs arranged in any suitable fashion.

A plurality of substantially rectangular straps 26 reinforces the attachment of floral holding material 22 to platform 24. Straps 26 are preferably implemented by an adhesive (e.g., tape), but may be any suitable straps or fasteners (e.g., string, rope, adhesive, rubber or other bands, etc.). By way of example only, two straps 26 extend substantially in parallel in a loop encompassing both floral holding material 22 and platform 24. In other words, the straps traverse the top and front and rear side surfaces of floral holding material 22, and the bottom and front and rear side surfaces of platform 24 (e.g., as viewed in FIGS. 2-3). This provides maximal surface area for floral holding material 22 to receive flowers 18 (FIG. 1). However, the straps may be positioned in any suitable fashion to secure the floral holding material to the platform. In addition, floral holding material 22 may be secured to the top surface of platform 24 via a bonding material (e.g., adhesive, glue, tape, etc.) with or without use of fastening device 28 and/or straps 26. Thus, the floral holding material may be secured to platform 24 by the fastening device, straps or adhesives (e.g., tape, glue, etc.) either individually, or in any combinations.

Figure 4:
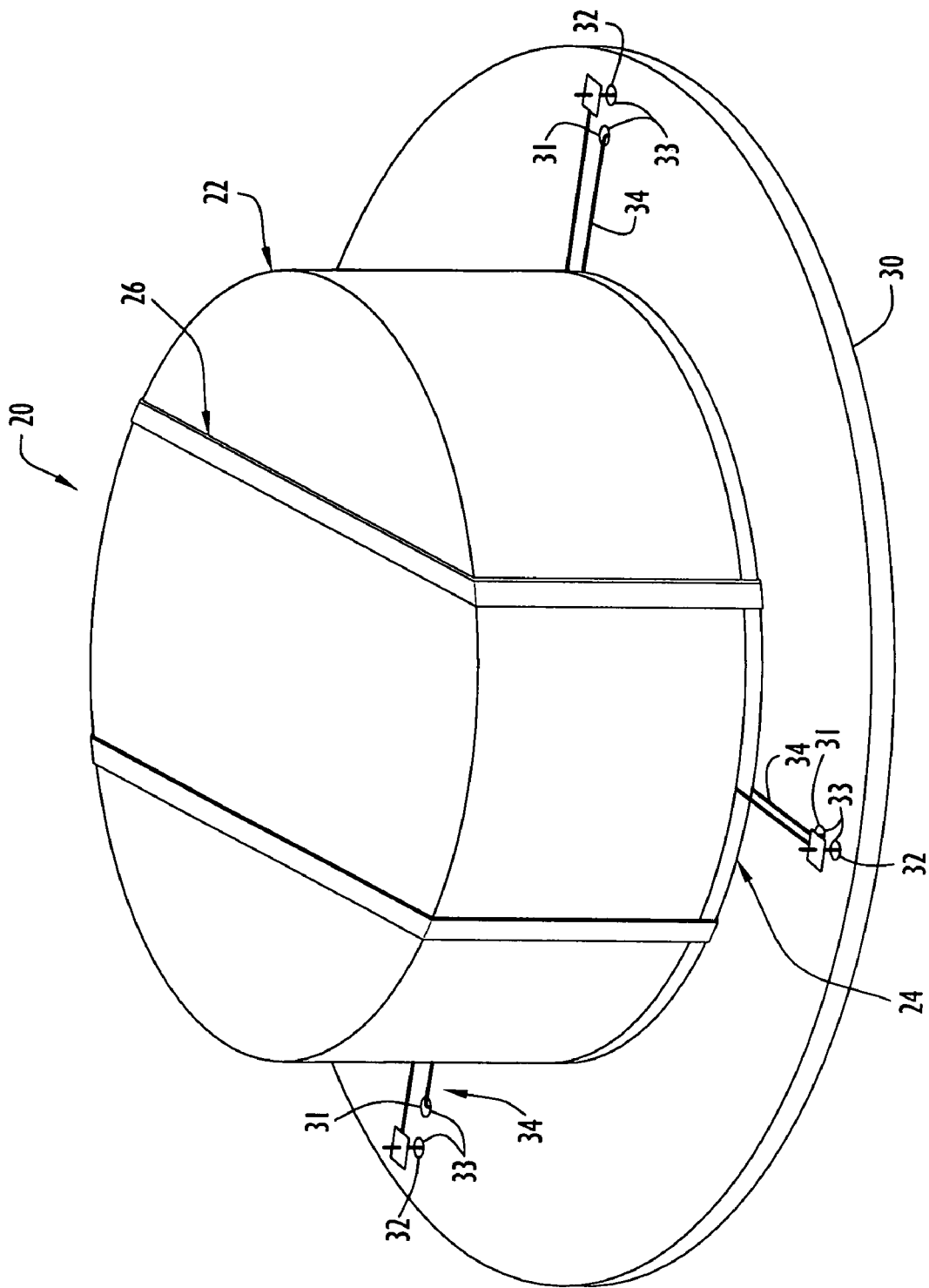
FIG. 4 is a view in perspective of an alternative embodiment of the floral retaining structure of FIG. 2 further including a plate with the structure platform secured to the plate.
Figure 5:
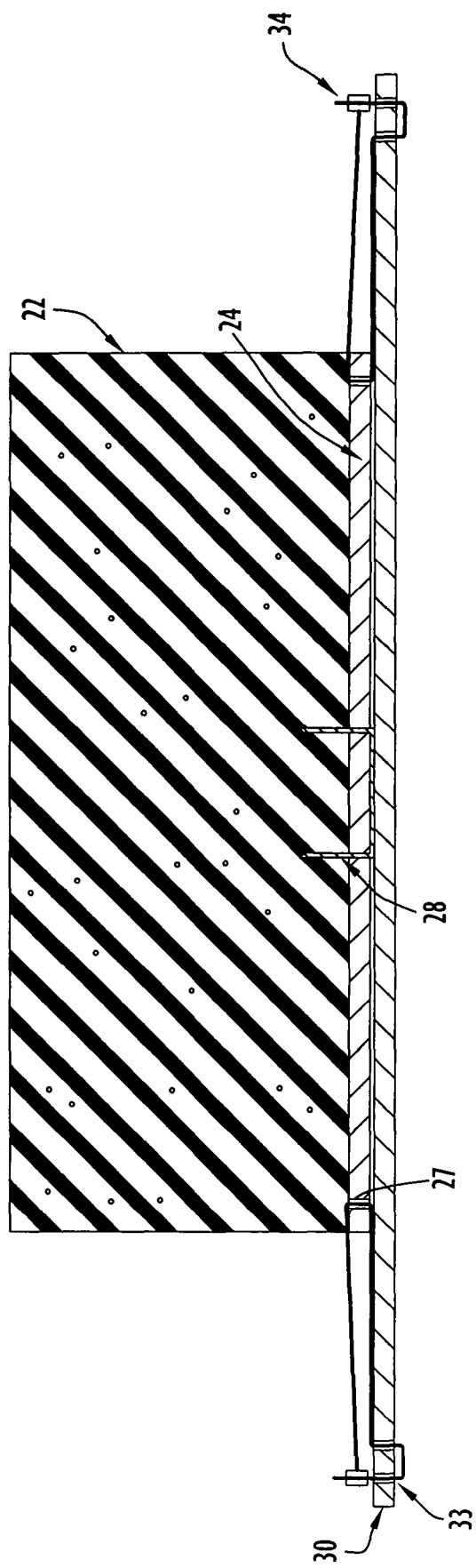
FIG. 5 is a view in elevation and partial section of the floral retaining structure of FIG. 4.

Floral retaining structure 20 may further include a stabilizing plate with the platform secured thereto according to an embodiment of the present invention as illustrated in FIGS. 4-6. Specifically, floral retaining structure 20 may further include a plate 30. The plate is substantially circular in the form of a disk and includes dimensions greater than those of platform 24. The platform is secured to plate 30, preferably at a substantially central location thereon, via a plurality of ties 34, where the plate stabilizes or provides enhanced reinforcement for the platform. In particular, platform 24 includes a series of openings 27 (FIGS. 5-6), each defined therein toward a platform peripheral edge and angularly spaced from each other by approximately 90°. Similarly, plate 30 includes a series of opening pairs 33, each opening pair defined therein toward a plate peripheral edge and angularly spaced from each other by approximately 90°. Opening pairs 33 each include an inner opening 31 and an outer opening 32. The outer opening is disposed proximate the plate peripheral edge, while inner opening 31 is disposed radially inward from and proximate outer opening 32 in substantial radial alignment with that outer opening.

Platform 24 is disposed on plate 30 with each platform opening 27 substantially radially aligned with a corresponding opening pair 33 of the plate. Each tie 34 is threaded through a corresponding platform opening 27 and extends toward a corresponding aligned opening pair 33 of plate 30. Ties 34 are each disposed through a corresponding inner opening 31 and traverse the plate bottom surface and outer opening 32 of that opening pair to return to corresponding platform opening 27. Ties 34 may be implemented by any suitable tying article (e.g., plastic ties, string, rope, thread, etc.). The platform and plate may include any suitable arrangement of openings, while the ties may alternatively be threaded through the openings in any suitable fashion to secure platform 24 to plate 30. The threading of ties 34 and locations of opening pairs 33 are positioned a sufficient distance from the floral holding material (or floral arrangement) to enable a customer to easily disengage the ties (e.g., cut the ties, etc.) and remove the floral arrangement from plate 30 for display.

Plate 30 is further secured to assembly base 14 as illustrated in FIG. 7. In particular, plate 30 is secured to the top surface of base 14. This may be accomplished by a bonding material 35 and/or a plurality of rivets 38. The bonding material may be implemented by any suitable adhesives (e.g., glue, hot glue, etc.) and preferably attaches the bottom surface of plate 30 to the top surface of base 14. Rivets 38 each include a substantially cylindrical stem or rod 37 and may further include substantially circular disks 36 disposed at one or more rod ends. The plate and base each include substantially aligned openings 39 to receive rivet rods 37 therethrough. The dimensions of the openings are slightly greater than those of rods 37 to enable the rods to be inserted through those openings.

Disks 36 may each be permanently or removably disposed at one or more ends of a corresponding rod 37. The disks include dimensions greater than those of the corresponding rod and openings 39, where a disk surface is attached to a corresponding rod end substantially perpendicular to that end and extends radially outward. For example, a disk 36 may be disposed at a rod end traversing a base opening 39 and extending beyond the bottom surface of base 14. This disk extends radially outward from the rod end to engage a portion of the base bottom surface. Similarly, a disk 36 may be disposed at the opposing rod end traversing a plate opening 39 and extending beyond the top surface of plate 30. This disk extends radially outward from the rod end to engage a portion of the plate top surface. In this fashion, the disks basically increase the area encompassed by rivets 38 and serve as stops to maintain attachment of plate 30 to base 14 by preventing removal of rivets 38 from aligned openings 39 within the plate and base. Rivets 38 are preferably disposed at least at central and peripheral locations on plate 30. However, the rivets may be of any quantity and may be disposed at any suitable locations to secure the plate to the base, while the base and plate may include any suitable arrangements for openings 39.

Figure 8A:
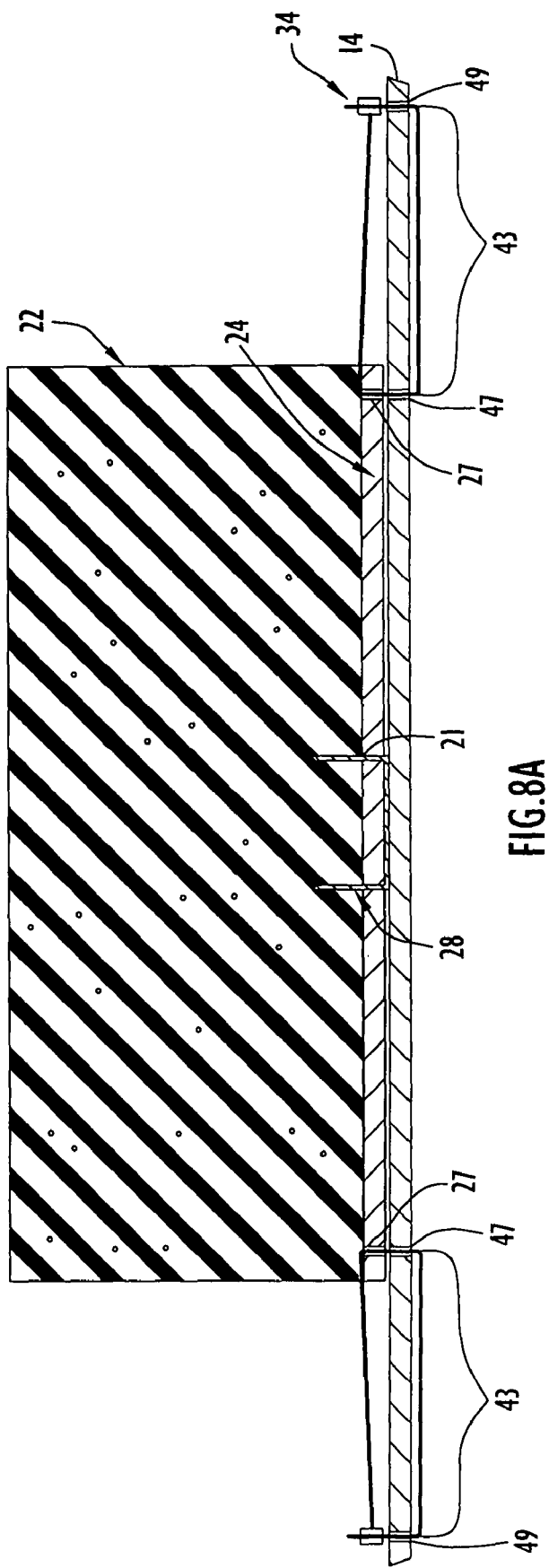
FIG. 8A is a view in elevation and partial section of the platform of the floral retaining structure of FIG. 2 secured directly to the assembly base according to an embodiment of the present invention.
Figure 8B:
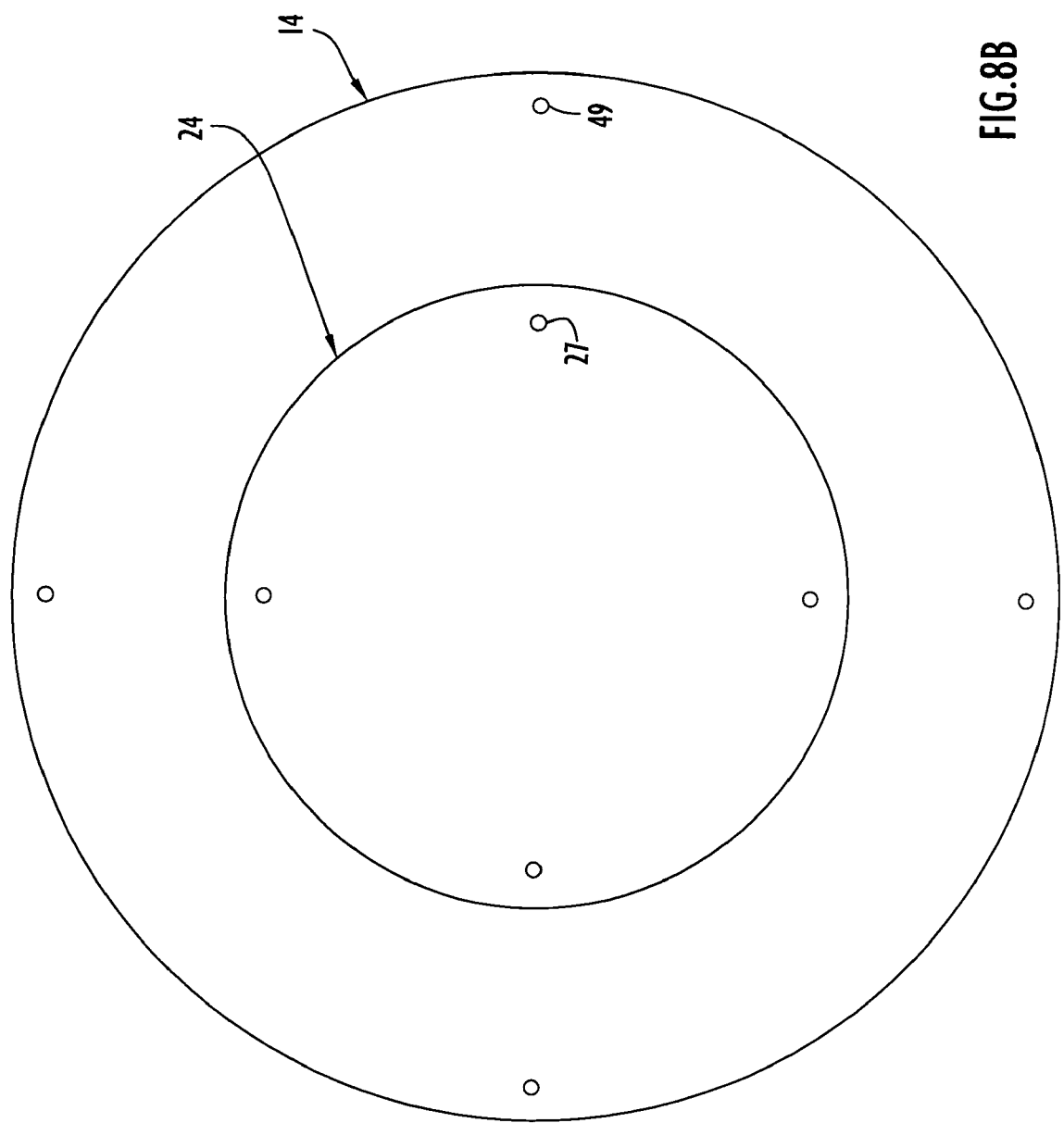
FIG. 8B is a top view in plan of the platform and assembly base of FIG. 8A.

Alternatively, floral retaining structure 20 may be secured directly to base 14 (e.g., without plate 30) according to an embodiment of the present invention as illustrated in FIGS. 8A-8B. Initially, base 14 may include sufficient rigidity to reinforce floral retaining structure 20. In this case, the floral retaining structure may be directly secured to and reinforced by base 14 (without employing plate 30). Specifically, platform 24 is secured to base 14, preferably at a substantially central location thereon, via a plurality of ties 34. In particular, platform 24 includes a series of openings 27, each defined therein toward a platform peripheral edge and angularly spaced from each other by approximately 90° in substantially the same manner described above for FIGS. 5-6. Similarly, base 14 includes a series of opening pairs 43, each opening pair angularly spaced from each other by approximately 90°. Opening pairs 43 each include an inner opening 47 and an outer opening 49. The outer opening is disposed proximate the base peripheral edge, while inner opening 49 is disposed radially inward from and in substantial radial alignment with a corresponding outer opening 47. Platform 24 is disposed on base 14 with each platform opening 27 substantially aligned with a corresponding inner opening 47 of the base.

Each tie 34 is threaded through a corresponding base outer opening 49 and extends toward corresponding aligned platform and inner openings 27, 47. Ties 34 are each disposed through the corresponding platform and inner openings and traverse the base bottom surface to return to corresponding outer opening 49. Ties 34 may be implemented by any suitable tying article (e.g., plastic ties, string, rope, thread, etc.). The base and plate may include any suitable arrangement of openings, while the ties may alternatively be threaded through the openings in any suitable fashion to secure platform 24 to base 14. The threading of ties 34 and locations of openings 49 are positioned a sufficient distance from the floral retaining structure (or floral arrangement) to enable a customer to easily disengage the ties (e.g., cut the ties, etc.) and remove the floral arrangement from base 14.

Further, floral retaining structure 20 may be directly secured to base 14 (e.g., without plate 30) via a fastening device or anchor as illustrated in FIG. 9. Specifically, the fastening device is utilized to engage platform 24 and floral holding material 22 to attach floral retaining structure 20 to base 14. A fastening device 53 is substantially similar to fastening device 28 described above and includes a substantially circular disk member 57 with a plurality of prongs 59 disposed toward a disk member peripheral edge and extending upwardly therefrom. Prongs 59 penetrate and engage floral holding material 22 and platform 24 to secure floral retaining structure 20 to base 14 (e.g., with a structure fastener 28 disposed on one or both sides of fastener 53). Disk member 57 is typically secured to the base bottom surface, preferably at a substantially central location thereon. Base 14 and platform 24 each include openings 51 with dimensions slightly greater than those of prongs 59. Openings 51 within the base are substantially aligned with corresponding openings 51 within the platform. Openings 51 are further arranged in the platform and base substantially coincident the prongs to receive the prongs therethrough. Prongs 59 extend through base 14 and platform 24 (e.g., via openings 51) and into floral holding material 22 to penetrate and engage that material, thereby securing the floral retaining structure to the base. Alternatively, disk member 57 may be secured to the top surface of base 14, preferably at a substantially central location thereon, via any suitable adhesives (e.g., tape, glue, etc.), where prongs 59 directly penetrate platform 24 (e.g., via openings 51) and engage the floral holding material. By way of example only, fastening device 53 includes three prongs angularly displaced from each other by approximately 120°. However, any quantity of fastening devices 28, 53 disposed at any locations with any quantity and arrangement of prongs may be utilized. This configuration provides enhanced stability and is preferable for hand delivery and other transport techniques that generally do not produce upside down orientations for the floral arrangement.

Figure 11:
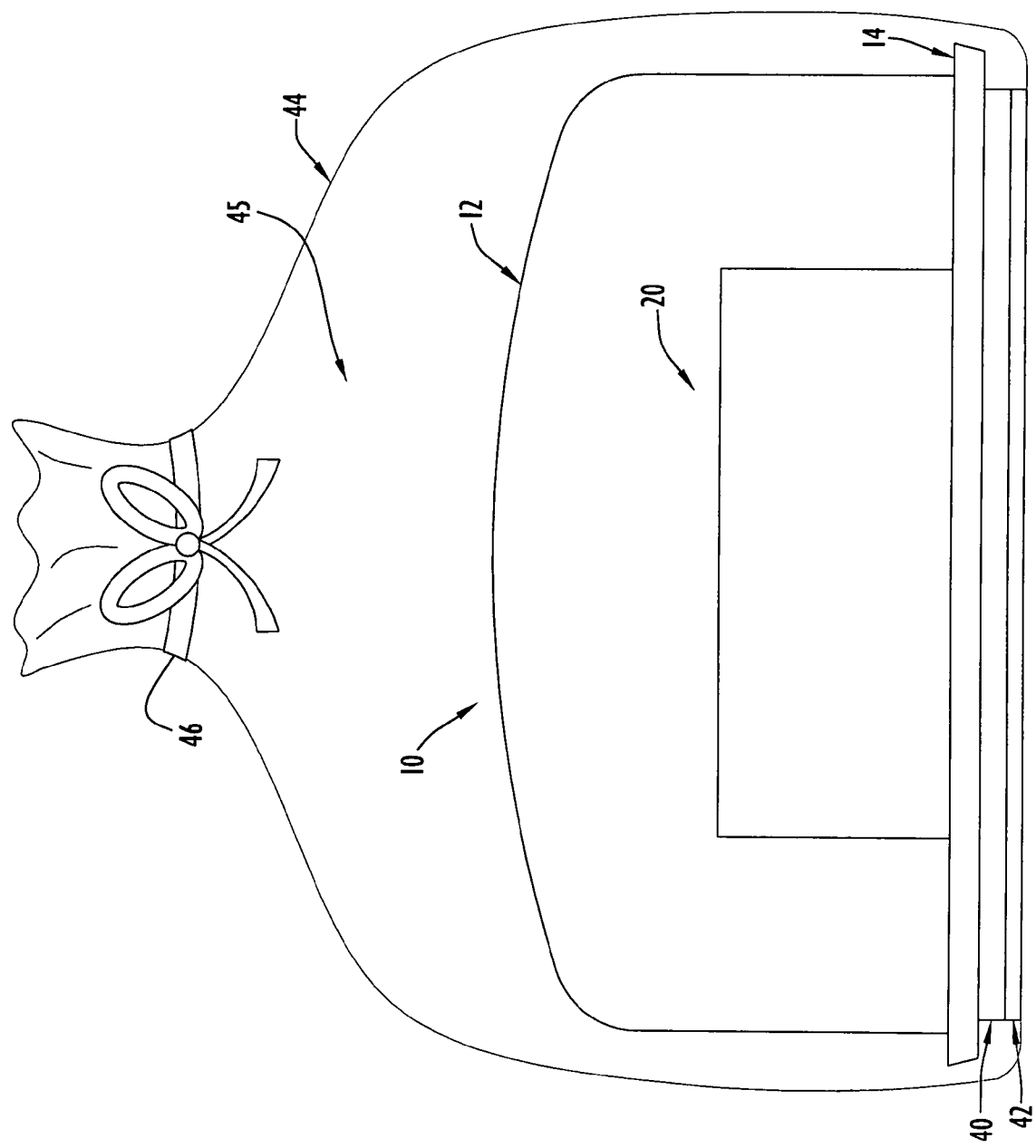
FIG. 11 is a view in elevation of the floral arrangement assembly of FIG. 1 placed within a waterproof bag with optional cooling and absorption materials according to an embodiment of the present invention.
Figure 12:
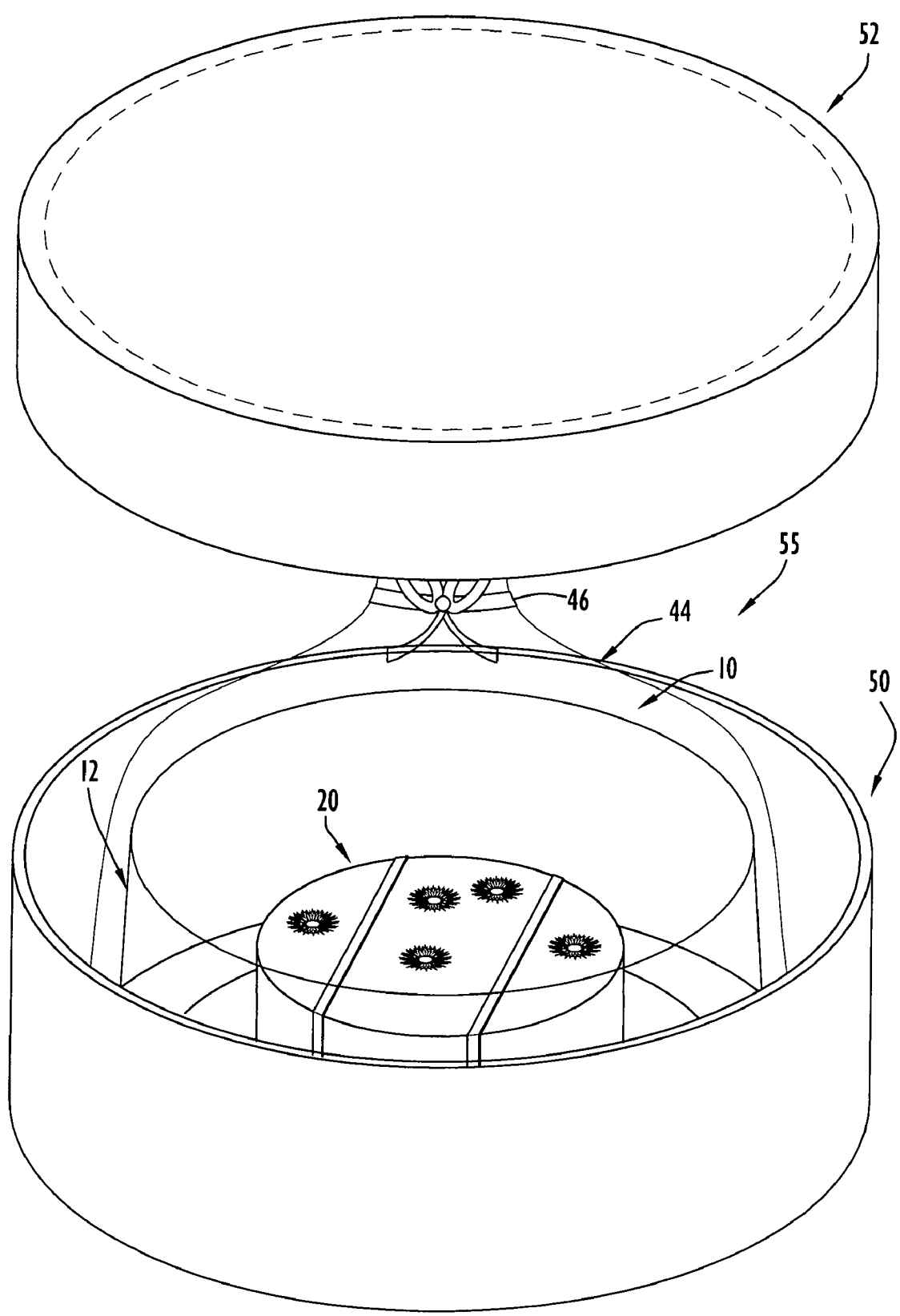
FIG. 12 is a view in perspective of the floral arrangement assembly of FIG. 1 placed within a hat type box according to an embodiment of the present invention.

Floral arrangement assembly 10 may serve as a shipping container to maintain the floral arrangement during shipping and handling to a desired destination or customer. Alternatively, the floral arrangement assembly may be used in combination with various wrappings and/or shipping containers. For example, floral arrangement assembly 10 may be placed within a waterproof bag (e.g., transparent, etc.) as illustrated in FIGS. 10-12. In particular, floral arrangement assembly 10 containing a floral arrangement may be placed inside a sheet of material 44. The material is preferably transparent and shaped in the form of a bag to define a receptacle 45 therein. The sheet is of sufficient size to receive and encompass the floral arrangement assembly within receptacle 45, and may be constructed of any suitable materials substantially impervious to water or other liquid. The peripheral portions of sheet 44 (beyond those required to encompass floral arrangement assembly 10 and/or define receptacle 45) are manipulated to extend upward beyond the top surface of cover 12 and are gathered and secured via a tie 46. The resulting package may be shipped and/or transported, where the floral arrangement assembly maintains the floral arrangement intact.

Referring to FIG. 11, receptacle 45 may further include a cooling material 40 to cool the receptacle environment and/or an absorption material 42 to absorb condensation from the floral holding material. In particular, cooling material 40 may be of any shape or size, and is placed under base 14 within receptacle 45 to provide temperature control for the floral arrangement during transport and/or shipping. The cooling material is preferably implemented by a chilled or frozen gel material, but may be implemented by any suitable materials to cool the receptacle environment. The cooling enhances the longevity of the floral arrangement during the time interval for shipping and transport.

Cooling material 40 may produce condensation on cover 12, flowers 18 and/or sheet 44 due to various temperature differences (e.g., between the internal and external receptacle environments, between the receptacle environment and floral arrangement, etc.). Accordingly, absorption material 42 may further be disposed between cooling material 40 and the receptacle bottom surface to enable the condensation, moisture and/or water from floral holding material 22, sheet 44 and/or other sources to be absorbed and controlled. The absorption material may be of any shape or size and may be constructed of any suitable materials (e.g., sponge materials, foam, etc.) to absorb the condensation, moisture and/or water within the receptacle. The resulting package may be shipped and/or transported, where the floral arrangement assembly maintains the floral arrangement intact, while the cooling and absorption materials enhance the longevity of the floral arrangement and maintain the receptacle environment relatively dry.

Further, sheet 44 including floral arrangement assembly 10 may be placed within a hat type box 55 as illustrated in FIG. 12. In particular, box 55 includes a body 50 and a lid 52. Body 50 is substantially cylindrical with an open top portion and a closed bottom portion. The dimensions of body 50 are greater than those of sheet 44 to enable the sheet with floral arrangement assembly 10 placed therein to be disposed within the body. Lid 52 is substantially cylindrical and includes an open bottom portion and a closed top portion. The dimensions of lid 52 are slightly greater than those of body 50 to enable the lid open portion to engage the body top portion. The height of lid 52 is less than the height of body 50, where the lid closed top portion serves as a stop to enable the lid to rest on the body top edges. However, the body and lid may be of any shape or size and may be constructed of any suitable materials (e.g., cardboard, plastic, etc.). Material 44 is placed within body 50, where lid 52 is placed on the body to close the box to provide enhanced protection of the floral arrangement assembly during shipping. Moreover, box 55 may further be placed within a corrugated shipping box for additional protection.

Figure 13:
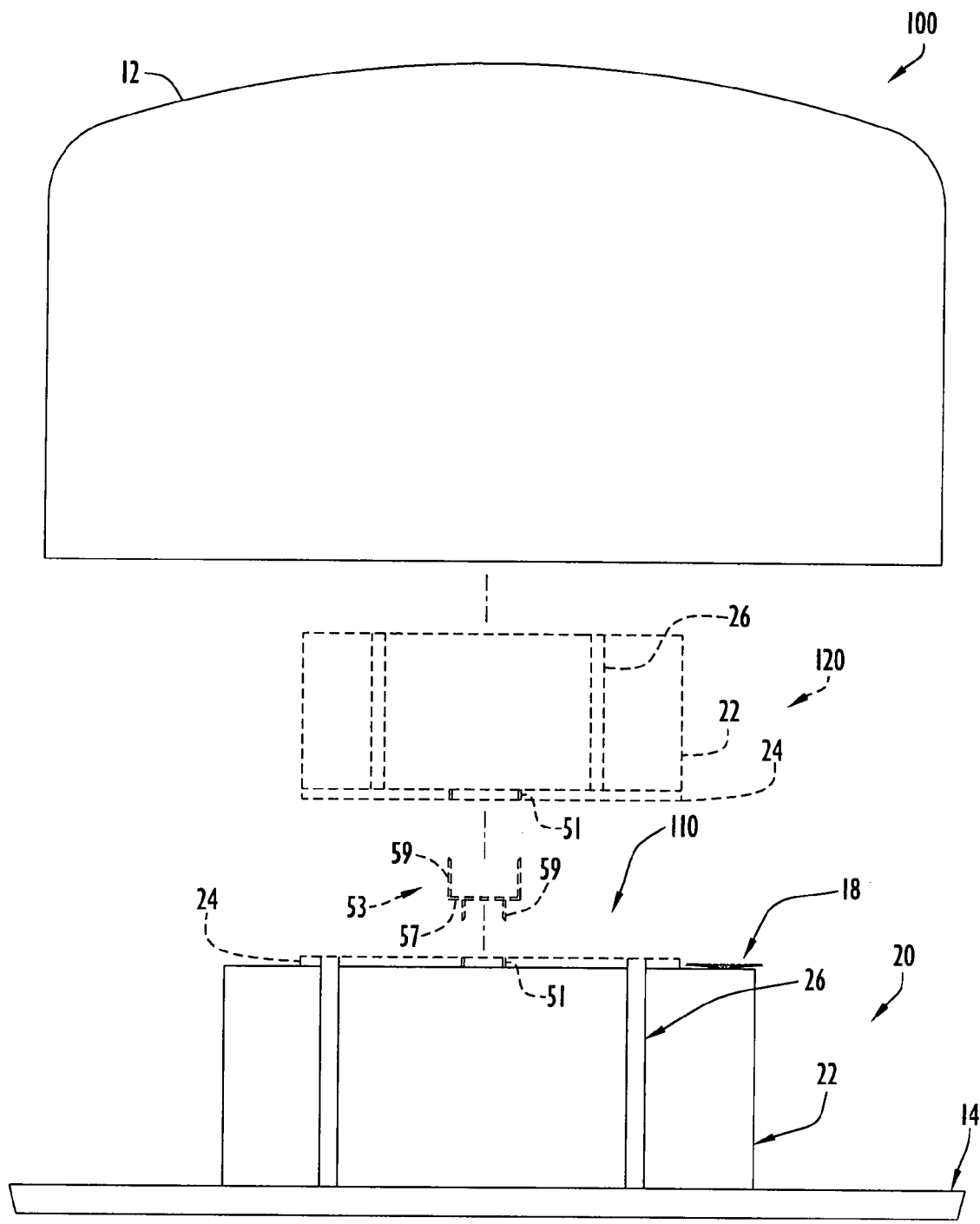
FIG. 13 is an exploded view in perspective of a floral arrangement assembly including a plural tier structure according to an embodiment of the present invention.

In addition, a floral arrangement assembly may include a plurality of floral retaining structures in a stacked relation to form a plural tier structure as illustrated in FIG. 13. Initially, floral arrangement assembly 100 is substantially similar to floral arrangement assembly 10 described above and includes cover 12, base 14, a lower floral retaining structure 20 and an upper floral retaining structure 120. Lower structure 20 is substantially similar to the floral retaining structure described above and includes floral holding material 22 secured to platform 24 as described above. The lower structure secures an arrangement of flowers 18 within floral holding material 22. However, no flowers are generally placed in a portion of the lower structure top surface to provide an area 110 to receive upper structure 120 thereon as described below. Area 110 is preferably substantially centrally located on the lower structure top surface and includes dimensions slightly less than those of upper structure 120.

Upper structure 120 is substantially similar to floral retaining structure 20 described above and includes floral holding material 22 secured to platform 24 (e.g., via straps 26, fastening device 28 and/or adhesives) as described above. The upper structure similarly secures an arrangement of flowers 18 within floral holding material 22. Upper structure 120 typically includes dimensions less than those of lower structure 20 to enable the upper structure to be placed on the lower structure top surface in stacked relation.

Upper structure 120 may simply be placed on lower structure 20 within area 110 in an unsecured fashion. Alternatively, the upper structure may be secured to lower structure 20 within area 110 in various manners. For example, upper structure 120 may be secured to lower structure 20 via a bonding material (e.g., adhesive, glue, tape, etc.). Further, fastening device 53 may be utilized to engage platform 24 and floral holding material 22 of upper structure 120 to attach the upper structure to lower structure 20. Fastening device 53 is substantially similar to the corresponding fastening device described above and includes disk member 57 with a plurality prongs 59 disposed toward a disk member peripheral edge and extending upwardly (and optionally downwardly) therefrom. Prongs 59 penetrate and engage the bottom surface of structure 120 (and optionally a platform 24 disposed on the top surface of structure 10 via straps 26 and/or an adhesive) to secure the upper structure to the lower structure. Disk member 57 is typically disposed on the lower structure top surface at a substantially central location thereon and within area 110. Platforms 24 of the upper and lower structures include openings 51 (as described above) with dimensions slightly greater than those of prongs 59. Openings 51 within the platforms are arranged coincident the prongs to receive the prongs therethrough. Prongs 59 extend through platforms 24 (e.g., via openings 51) and into floral holding material 22 of the upper and lower structures to penetrate and engage those materials, thereby securing the upper structure to the lower structure.

In addition, straps 26 of the upper structure may be further utilized to secure the upper structure to the lower structure. By way of example only, two straps 26 may extend substantially in parallel in a loop encompassing both the upper and lower structures. However, the straps may be positioned in any suitable fashion to secure the upper structure to the lower structure. The upper structure may be secured to the top surface of the lower structure via the bonding material (e.g., adhesive, glue, tape, etc.) with or without use of fastening device 53 and/or straps 26. Thus, the upper structure may be secured to the lower structure by the fastening device, straps or adhesives (e.g., tape, glue, etc.) either individually, or in any combinations. Floral arrangement assembly 100 may include any quantity of tiers or floral retaining structures, where each tier may be secured to one or more other tiers at any suitable locations in manners similar to those described above.

Lower structure 20 may be directly secured to base 14 or secured to the base via plate 30 in substantially the same manner descried above. Floral arrangement assembly 100 may serve as a shipping container to maintain the floral arrangement during shipping and handling to a desired destination or customer in substantially the same manner described above. Alternatively, floral arrangement assembly 100 may be used in combination with various wrappings and/or shipping containers in substantially the same manner described above. For example, floral arrangement assembly 100 may be placed within a waterproof bag as described above for FIGS. 10-11 (with or without the cooling and absorption materials), or within a hat type box as described above for FIG. 12.

In addition, the various tiers or floral retaining structures of floral arrangement assembly 100 may be shipped as an assembled unified floral arrangement within assembly 100, or may be shipped together or separately in an unassembled fashion, where the customer or recipient places the structures in stacked relation (e.g., in an unsecured manner, or in a secured manner via the adhesives and/or fastening device as described above). When the floral arrangement is shipped in an unassembled form, the individual tiers may be shipped together or separately (e.g., each as an individual floral arrangement assembly in the manner described above), where the individual floral arrangement assemblies prevent the floral arrangements within the individual tiers from becoming disarrayed and can withstand the forces and conditions applied during shipping (e.g., various orientations (e.g., sideways, upside down, swaying, etc.), vibrations, etc.) to maintain those floral arrangements intact.

Operation of the present invention embodiments is described with reference to FIGS. 1-7, 8A-8B and 9-13. Initially, floral retaining structure 20 is assembled with floral holding material 22 attached to platform 24 as described above. Flowers 18 are inserted into floral holding material 22 to produce a desired floral arrangement. Platform 24 of the floral retaining structure may be secured to stabilizing plate 30 for attachment to a shipping and/or display container (e.g., base 14), or may be directly attached to the container as described above. Alternatively, flowers 18 may be inserted within the floral holding material prior to or after attachment of the floral holding material to the container or stabilizing plate.

The cover of the container (e.g., cover 12) may be placed over the floral arrangement assembly and the assembly may be shipped to a desired destination. The floral arrangement assembly prevents the floral arrangement from becoming disarrayed and can withstand the forces and conditions applied during shipping (e.g., various orientations (e.g., sideways, upside down, swaying, etc.), vibrations, etc.) to maintain the floral arrangement intact. The floral arrangement assembly may further be placed within various shipping containers (e.g., waterproof or other bags, boxes, etc.) with optional cooling and/or absorption materials to prolong longevity of the arrangement and absorb condensation as described above. Once the floral arrangement is received, the floral arrangement may be detached from the container (e.g., by cutting the ties securing the platform and/or plate) for transport to a desired location and/or display.

In the case where the floral arrangement assembly includes a plurality of floral retaining structures, flowers 18 are inserted into the floral holding materials of the additional structures to produce the desired plural tier floral arrangement in substantially the same manner described above. Platform 24 of the lowest tier floral retaining structure may be secured to stabilizing plate 30 for attachment to a shipping and/or display container (e.g., base 14), or may be directly attached to the container in substantially the same manner described above.

The plural tier arrangement may be shipped in various containers in an assembled or unassembled fashion. In the event of shipping in an assembled form, the additional tiers are secured to the lower tiers in substantially the same manner described above and the cover of the container may be placed over the floral arrangement assembly for shipping to a desired destination. The floral arrangement assembly prevents the floral arrangement from becoming disarrayed and can withstand the forces and conditions applied during shipping (e.g., various orientations (e.g., sideways, upside down, swaying, etc.), vibrations, etc.) to maintain the floral arrangement intact. The floral arrangement assembly may further be placed within various shipping containers (e.g., waterproof or other bags, boxes, etc.) with optional cooling and/or absorption materials to prolong longevity of the arrangement and absorb condensation, moisture and/or water as described above. Once the floral arrangement is received, the floral arrangement may be detached from the container (e.g., by cutting the ties securing the platform and/or plate) for transport to a desired location and/or display.

When the floral arrangement is shipped in an unassembled form, the individual tiers may be shipped together or separately (e.g., each as an individual floral arrangement assembly in the manner described above), where this arrangement prevents the floral arrangement from becoming disarrayed and can withstand the forces and conditions applied during shipping (e.g., various orientations (e.g., sideways, upside down, swaying, etc.), vibrations, etc.) to maintain the floral arrangement intact. The individual floral arrangement assemblies may further be placed within various shipping containers (e.g., waterproof or other bags, boxes, etc.) with optional cooling and/or absorption materials to prolong longevity of the arrangement and absorb condensation as described above. Once the floral arrangements are received, the floral retaining structures may be detached from the containers (e.g., by cutting the ties securing the platform and/or plate) for assembly and/or display. The customer or recipient assembles the floral arrangement by placing the tiers in stacked relation as described above (e.g., in an unsecured manner, or in a secured manner via the adhesives and/or fastening device).

It will be appreciated that the embodiments described above and illustrated in the drawings represent only a few of the many ways of implementing a method and apparatus for displaying and transporting floral arrangements.

The floral arrangement assembly may be of any shape or size and may be constructed of any suitable materials. The floral arrangement assembly may include any suitable types of containers of any shapes or sizes for display, transport and/or shipping (e.g., dome type, box and lid, etc.). The floral arrangement assembly preferably includes transparent materials to enable viewing of the floral arrangement, but any portion of the assembly may be transparent to enable the viewing. Further, the assembly materials may include any suitable degree of transparency (e.g., transparent, translucent, opaque, etc.). The floral arrangement assembly may contain any quantity of any types of floral arrangements (e.g., cakes, bouquets, fresh-cut flowers, dried flowers, imitation flowers, etc.). The base and cover may be of any quantity shape or size and may be constructed of any suitable materials (e.g., plastics, etc.).

The floral retaining structure may be of any quantity shape or size, may be constructed of any suitable materials and may be disposed at any suitable locations on the platform, plate and/or container base. The floral holding material may be of any quantity, shape or size and may be constructed of any suitable materials (e.g., foam, sponge material, etc.) for retaining flowers or other items within a floral arrangement (e.g., novelty items, etc.). The floral holding material may receive flowers or other items at any suitable locations on the material.

The platform may be of any quantity, shape or size and may be constructed of any suitable materials (e.g., plastics, etc.). The floral holding material may be secured or attached to the platform at any suitable locations via any suitable techniques (e.g., straps, adhesives, glue, tape, fasteners, etc.). The fastening device and corresponding components (e.g., disk member, prongs, etc.) may be of any quantity, shape or size, and may be constructed of any suitable materials (e.g., plastics, metals, etc.). The fastening device may be secured to the platform at any suitable locations (e.g., top and/or bottom surfaces, etc.) via any conventional or other techniques (e.g., adhesives, etc.). The fastening device may include any quantity of prongs of any suitable dimensions and disposed on the disk member at any suitable locations. The prongs may engage the platform and/or floral holding material at any suitable locations. The openings in the platform receiving the prongs may be of any quantity, shape or size and may be defined in the platform at any suitable locations.

The straps may be of any quantity, shape or size, may be constructed of any suitable materials (e.g., rubber or other elastic material, fabric material, adhesive material, etc.). The straps may be arranged to traverse any portions of the floral holding material and/or platform in any suitable fashion (e.g., parallel, perpendicular, diagonal, etc.) to secure the floral holding material to the platform.

The plate may be of any quantity, shape or size and may be constructed of any suitable materials (e.g., plastics, etc.). The platform may be secured or attached to the plate at any suitable locations via any suitable techniques (e.g., ties, glue, tape, fasteners, etc.). The openings within the plate and platform to receive the ties may be of any quantity, shape or size and may be defined at any suitable locations. The ties may be of any quantity, shape or size and may be constructed of any suitable materials or tying structures (e.g., wire, string, rope, plastics, thread, etc.). The ties may secure any locations on the platform to any suitable locations on the plate. Further, the ties may be threaded through the plate and platform openings in any suitable fashion to secure the platform to the plate. Moreover, the platform and floral holding material may alternatively be secured to the plate via a fastening device in substantially the same manner described above.

The plate may be secured to the base via any conventional or other techniques (e.g., pins, rivets, adhesives, fasteners, etc.). The rivets may be of any quantity, shape or size, may be constructed of any suitable materials (e.g., plastics, metals, etc.) and may be disposed at any suitable locations to secure the plate to the base. The openings in the base and plate receiving the rivets may be of any quantity, shape or size and may be defined in the base and plate at any suitable locations. The rivet stems and disks may be of any quantity, shape or size, and may be constructed of any suitable materials (e.g., plastics, metals, etc.). The disks may be disposed at one or more ends of the rivet stems, and/or at any other suitable locations on the rivets. Moreover, the plate, platform and floral holding material may alternatively be secured to the base via a fastening device in substantially the same manner described above.

The base may be of any quantity, shape or size and may be constructed of any suitable materials (e.g., plastics, etc.). The platform may be secured or attached to the base at any suitable locations via any suitable techniques (e.g., ties, glue, tape, fasteners, etc.). The openings within the base and platform to receive the ties may be of any quantity, shape or size and may be defined at any suitable locations. The ties may be of any quantity, shape or size and may be constructed of any suitable materials or tying structures (e.g., wire, string, rope, plastics, thread, etc.). The ties may secure any locations on the platform to any suitable locations on the base. Further, the ties may be threaded through the base and platform openings in any suitable fashion to secure the platform to the base. The fastening device and corresponding components (e.g., disk member, prongs, etc.) may be of any quantity, shape or size, and may be constructed of any suitable materials (e.g., plastics, metals, etc.). The fastening device may be secured to the base at any suitable locations (e.g., top and/or bottom surfaces, etc.) via any conventional or other techniques (e.g., adhesives, etc.). The fastening device may include any quantity of prongs of any suitable dimensions and disposed on the disk member at any suitable locations. The prongs may engage the base, platform and/or floral holding material at any suitable locations. The openings in the platform and base receiving the prongs may be of any quantity, shape or size and may be defined in the platform and base at any suitable locations.

The floral arrangement assembly (including the varying floral retaining structures described above) may be placed within any type of container for any type of handling, transport and/or shipping (e.g., common carrier, hand delivery, moving between locations, ground vehicle, air vehicle, water vehicle, etc.). The containers may contain or include any quantity of floral arrangement assemblies. The sheet may be of any quantity, shape or size and may be constructed of any suitable materials (e.g., plastics, etc.), preferably impervious to water or other liquids. The sheet may define a receptacle of any size or shape suitable to contain the floral arrangement assembly. The sheet may be gathered and closed with any suitable tying or other device (e.g., tie, rope, string, thread, ribbon, clamp, etc.). The sheet or other containers may include any quantity of any thermal treatment and/or absorption materials. The thermal treatment material may be of any quantity, shape or size and may heat and/or cool the container interior. The thermal treatment material may include any suitable thermal materials (e.g., frozen or chilled gel, chemicals, etc.). The absorption material may be of any quantity, shape or size and may include any suitable materials (e.g., sponge material, etc.) to absorb condensation, moisture and/or water within the container. The thermal treatment and absorption materials may be disposed at any suitable locations on or within the container. Further, the container with the floral arrangement assembly or assemblies may be placed within another container (e.g., shipping box, etc.) for enhanced protection.

The box may be of any quantity, shape, size or type (e.g., hat type, shipping box, etc.) and may be constructed of any suitable materials (e.g., cardboard, plastic, etc.). The box components (e.g., body, lid, etc.) may be of any quantity, shape or size and may be constructed of any suitable materials (e.g., cardboard, plastic, etc.). The box may receive the floral arrangement assembly or the floral arrangement assembly contained within another container (e.g., waterproof or other bag, another box, etc.).

The plural tier structure may include any quantity of floral retaining structures arranged and secured to each other in any fashion (e.g., stacked, side by side, etc.) to produce any desired floral arrangement. The tiers may be secured to each other at any suitable locations via any conventional or other techniques (e.g., adhesives, straps, fasteners, etc.). The fastening device and corresponding components (e.g., disk member, prongs, etc.) may be of any quantity, shape or size, and may be constructed of any suitable materials (e.g., plastics, metals, etc.). The fastening devices may be secured to a tier at any suitable locations (e.g., top surface, etc.) via any conventional or other techniques (e.g., adhesives, etc.). The fastening device may include any quantity of prongs of any suitable dimensions and disposed on the disk member at any suitable locations. The prongs may engage the platform, and/or floral holding materials at any suitable locations. The straps may be of any quantity shape or size, may be constructed of any suitable materials (e.g., rubber or other elastic material, fabric material, adhesive material, etc.). The straps may be arranged to traverse any portions of the tiers in any suitable fashion (e.g., parallel, perpendicular, diagonal, etc.) to secure a tier to one or more other tiers. The plural tier floral arrangement assembly may be placed within any type of container (e.g., waterproof or other bag, boxes, dome type, etc.) for any type of handling, transport and/or shipping (e.g., common carrier, hand delivery, moving between locations, ground vehicle, air vehicle, water vehicle, etc.), where the containers may include any suitable thermal treatment and/or absorbing materials as described above. The individual tiers may be shipped as an assembled unit, or in unassembled form where each tier may be shipped together or separately as an individual floral arrangement assembly. The containers may include any quantity of plural tier and/or individual tier floral arrangement assemblies.

The present invention embodiments are not limited to the applications described above, but may be utilized to maintain any suitable arrangements (e.g., floral, candy or other food items, balloons or other novelty items, etc.) intact during handling, transport and/or shipping. The present invention embodiments may be utilized to maintain an arrangement intact for any suitable type of transport (e.g., common carrier, hand delivery, moving between locations, ground vehicle, air vehicle, water vehicle, etc.). The floral arrangement assemblies may be utilized without the base and/or cover for displaying the floral arrangement. The platform and/or plate are preferably fixedly secured to each other and/or the base, but may be secured in a manner include any suitable degree of motion to maintain the floral arrangement.

It is to be understood that the terms "top", "bottom", "front", "rear", "side", "height", "length", "width", "upper", "lower", "thickness", "vertical", "horizontal" and the like are used herein merely to describe points of reference and do not limit the present invention embodiments to any particular orientation or configuration.

From the foregoing description, it will be appreciated that the invention makes available a novel method and apparatus for displaying and transporting floral arrangements, wherein a floral arrangement assembly or packaging protects and maintains a floral arrangement intact during display, transport and/or shipping.

Having described preferred embodiments of a new and improved method and apparatus for displaying and transporting floral arrangements, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A floral arrangement assembly for maintaining a floral arrangement for transport comprising:
    a packaging including a base to receive said floral arrangement;
    a floral retaining structure coupled to said base to secure said floral arrangement, wherein said floral retaining structure includes:
        a platform assembly forming a bottom of said floral retaining structure and including one or more plate members;
        a floral holding material to receive a plurality of flowers and form said floral arrangement; and
        a structure fastener to attach said floral holding material to said platform assembly; and
    an assembly fastener to attach said floral retaining structure to said base, wherein said assembly fastener is disposed below a bottom surface of said base and extends through bottom and top surfaces of each of said base and a bottommost plate member of said platform assembly to securely attach said floral retaining structure to said base to withstand adverse movement related to transport of said floral arrangement assembly and maintain said floral arrangement.

2. The assembly of claim 1, wherein said structure fastener includes an adhesive.

3. The assembly of claim 1, wherein said structure fastener includes a fastening device with at least one prong that engages said floral holding material to secure said floral holding material to said platform assembly.

4. The assembly of claim 3, wherein said floral retaining structure further includes:
    at least one strap to secure said floral holding material to said platform assembly.

5. The assembly of claim 1, wherein said plate member of said platform assembly and said base each include a plurality of openings defined therein, and said assembly fastener includes a plurality of ties each threaded through corresponding openings of said plate member and base to removably secure said platform assembly to said base.

6. The assembly of claim 5, wherein at least one opening of said base is defined toward a base peripheral edge and at least one opening of said plate member and said base are aligned with each other, and wherein said plurality of ties are threaded through and extend between said aligned and peripheral openings.

7. The assembly of claim 1, wherein said assembly fastener includes a fastening device with at least one prong that engages said platform assembly and floral holding material to secure said floral retaining structure to said base.

8. A floral arrangement assembly for maintaining a floral arrangement for transport comprising:
    a packaging including a base to receive said floral arrangement;
    a floral retaining structure coupled to said base to secure said floral arrangement, wherein said floral retaining structure includes:
        a platform;
        a plate in the form of a disk with dimensions greater than dimensions of said platform to receive said platform thereon;
        a plate fastener to secure said platform to said plate;

a floral holding material to receive a plurality of flowers and form said floral arrangement; and
a structure fastener to attach said floral holding material to said platform; and
an assembly fastener to secure said plate to said base for securing said floral retaining structure to said base to withstand adverse manipulation related to transport of said floral arrangement assembly and maintain said floral arrangement.

9. The assembly of claim 8, wherein said platform and said plate each include a plurality of openings defined therein, and said plate fastener includes a plurality of ties each threaded through corresponding openings of said platform and plate to removably secure said platform to said plate.

10. The assembly of claim 9, wherein at least one opening of said platform is defined toward a platform peripheral edge and said openings of said plate are arranged in arrays and defined toward a plate peripheral edge, and wherein said plurality of ties are threaded through and extend between corresponding ones of said platform openings and said arrays of plate openings.

11. The assembly of claim 8, wherein said assembly fastener includes at least one of an adhesive and one or more rivets to secure said plate to said base.

12. The assembly of claim 1, further including a plurality of additional floral retaining structures, wherein said additional floral retaining structures are secured to said floral retaining structure that is coupled to said base.

13. The assembly of claim 1, further including:
a container to receive said packaging containing said floral arrangement.

14. The assembly of claim 13, wherein said container includes a sheet configured to define a receptacle therein, wherein said packaging containing said floral arrangement is disposed within said receptacle.

15. The assembly of claim 14, wherein said receptacle further includes at least one of a thermal treatment material to thermally treat the floral arrangement and absorption material to absorb condensation within said receptacle.

16. The assembly of claim 13, wherein said container includes a box.

17. The assembly of claim 13, further including:
a second container to receive said container including said packaging with said floral arrangement.

18. The assembly of claim 1, wherein said transport includes shipping via a carrier.

19. The assembly of claim 1, wherein said packaging further includes:
a corresponding cover for said base to encompass said floral arrangement on said base.

20. The assembly of claim 8, wherein said packaging further includes:
a corresponding cover for said base to encompass said floral arrangement on said base.

* * * * *